United States Patent [19]

McCartney

[11] 4,042,806
[45] Aug. 16, 1977

[54] VENTILATED RANGE WITH PLUG-IN COOKING UNITS

[75] Inventor: Edward O. McCartney, Greenfield, Ind.

[73] Assignee: Jenn Air Corporation, Indianapolis, Ind.

[21] Appl. No.: 760,621

[22] Filed: Jan. 19, 1977

[51] Int. Cl.² ............................................. H05B 3/68
[52] U.S. Cl. ...................................... 219/447; 99/340; 99/422; 126/21 A; 126/301; 219/400; 219/446; 219/460; 219/464
[58] Field of Search ..................... 99/340, 400, 421 R, 99/422, 446, 447; 219/403, 443, 444, 445, 454, 455, 460, 461, 462, 463, 464, 521, 400, 446, 447; 126/21 A, 300, 301

[56] References Cited

U.S. PATENT DOCUMENTS

| | | | |
|---|---|---|---|
| 2,843,716 | 7/1958 | Del Francia | 219/447 |
| 3,444,805 | 5/1969 | Happel et al. | 99/340 |
| 3,474,724 | 10/1969 | Jenn | 99/340 X |
| 3,632,982 | 1/1972 | Linger | 219/447 |
| 3,712,819 | 1/1973 | Field | 99/400 |
| 3,756,217 | 9/1973 | Field | 126/301 X |
| 3,797,375 | 3/1974 | Cerola | 99/340 |
| 3,924,100 | 12/1975 | Mark et al. | 219/403 X |
| 3,941,043 | 3/1976 | Cerola et al. | 219/447 X |

Primary Examiner—Volodymyr Y. Mayewsky
Attorney, Agent, or Firm—Woodard, Weikart, Emhardt & Naughton

[57] ABSTRACT

Disclosed is a plug-in circuit arrangement for a ventilated range which permits a single, manual switch to control the level of heat output of the rear electrical heating unit in a surface cooking plug-in cartridge and also the level of heat output of a plug-in broil unit depending upon which of the two is inserted in the range, with the wiring of the receptacle and the broil unit combining, when the broil unit is plugged in, to operate the motor of the ventilating fan automatically whenever the broil unit is energized by the control switch, the same control switch, when actuated, energizing only the rear heating unit of the surface cooking cartridge, and not the ventilating fan, when the surface cooking cartridge is plugged into the range.

2 Claims, 7 Drawing Figures

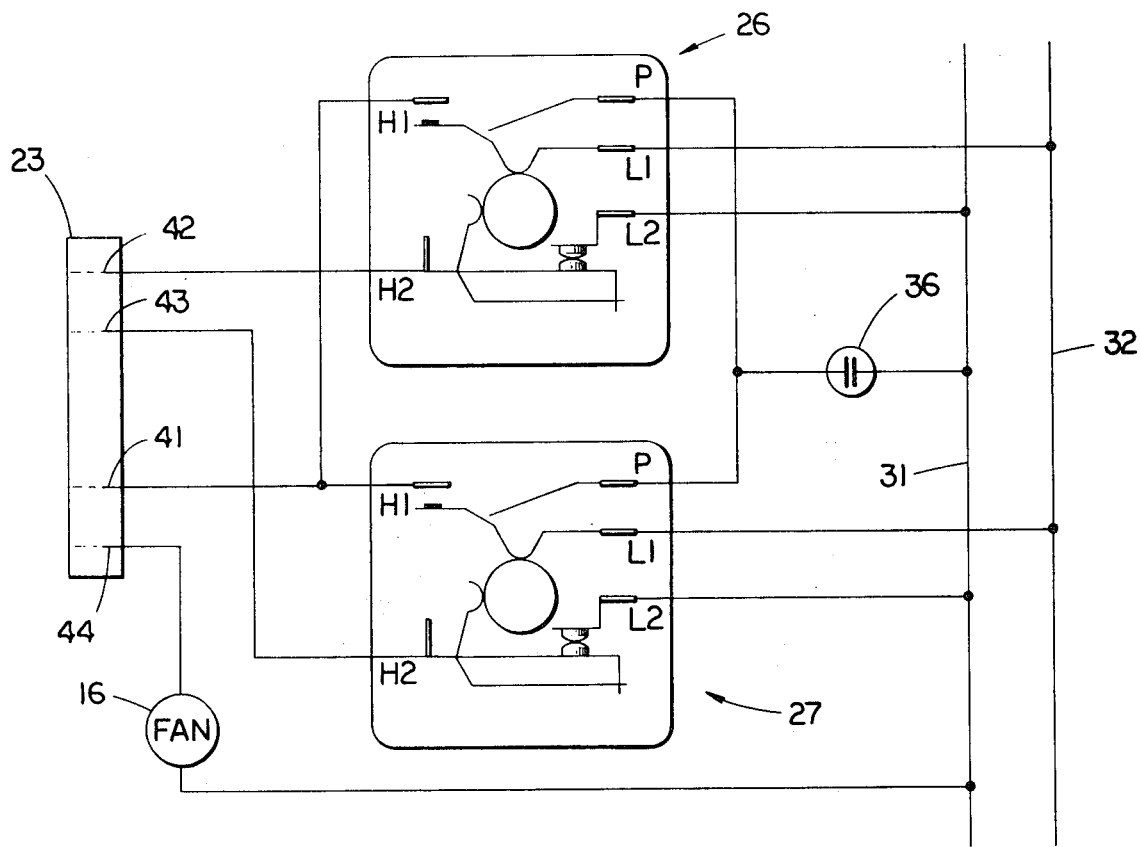
Fig. 1
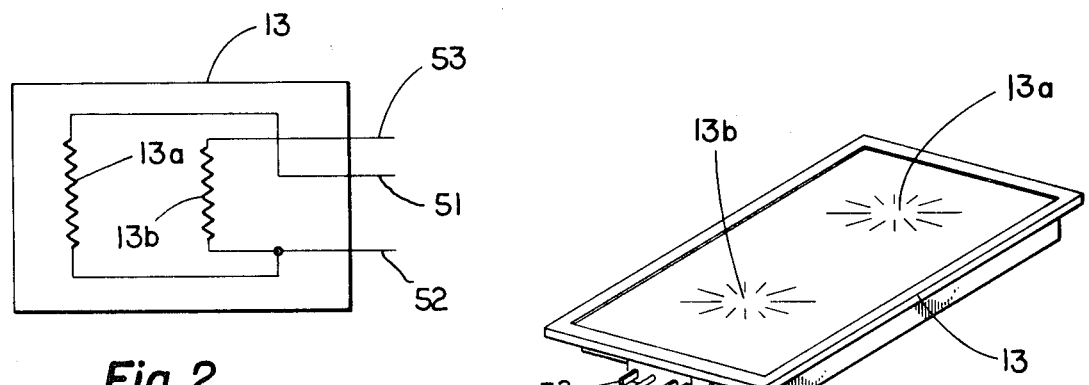
Fig. 2
Fig. 3
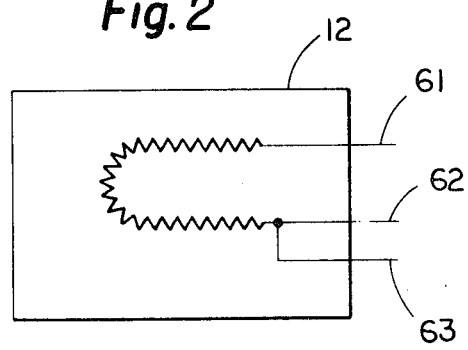
Fig. 4

VENTILATED RANGE WITH PLUG-IN COOKING UNITS

BACKGROUND OF THE INVENTION

A typical ventilated range with plug-in units permitting insertion, alternately, of any one of several various plug-in cooking devices is disclosed in Cerola U.S. Pat. No. 3,797,375. Approval of such ranges by safety inspecting bodies, such as United Laboratories, requires that the surface unit ventilating fan be automatically placed in operation whenever the plug-in broiling or grill element is energized. In these ranges, flexibility of operation requires that the receptacle in the range accomodate either a plug-in broil element (requiring ventilating fan operation) or, alternatively, a two element surface cooking plug-in cartridge (not requiring ventilating fan operation). The surface cooking cartridge incorporates conventionally spaced front and rear heating elements and these are individually controlled, as is conventional by separate, range mounted, manually operated control switches. That switch controlling a certain one of the cartridge heating units, conventionally the rear one, must also double as the controlling switch for the broil element when it is inserted in the range in place of the surface cooking cartridge. Wiring the switch, the broil element and the ventilating fan drive motor in series-parallel relation results in unnecessary (and sometimes undesirable) operation of the ventilating fan whenever the rear heating element of the surface cooking cartridge is energized. The rear heating element cannot be operated without operation of the ventilating fan although safety requirements indicate only that the broil element, when it replaces the surface cooking cartridge, must be operated with the ventilating fan.

The prong and socket circuit arrangement necessary to eliminate this difficulty is disclosed herein and forms the subject matter of the present invention.

Brief Description Of The Drawings

FIG. 1 is a schematic wiring diagram of the receptacle, control switches and ventilating fan.

FIG. 2 is a schematic, top plan view of the plug-in broil element.

FIG. 3 is a schematic, top plan view of the surface cooking cartridge.

FIG. 4 is a perspective of the cartridge shown schematically in FIG. 3.

DESCRIPTION OF THE PREFERRED EMBODIMENT

Figure 5:
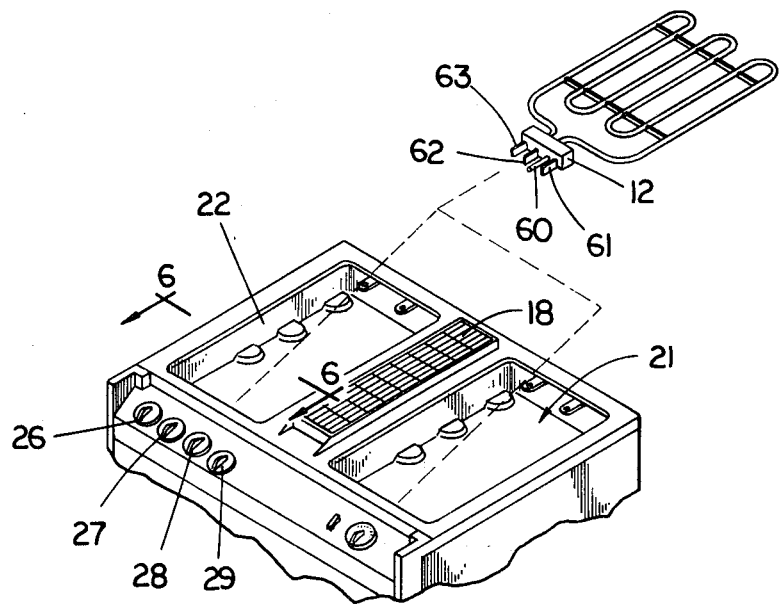
FIG. 5 is a perspective view of the upper surface of the range with the broil element of FIG. 4 shown poised for insertion.
Figure 7:
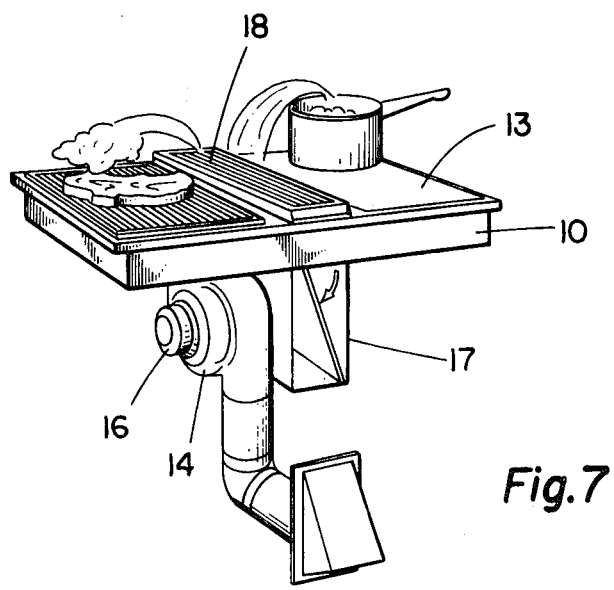
FIG. 7 is a perspective, schematic view of the ventilated range of FIG. 5 with a surface cooking cartridge and a broil element (with overlying grate) in place in the range.

In FIG. 7 there is schematically shown the upper portion of a range which may be installed in a countertop or may be incorporated in a free standing range as shown fragmentarily in FIG. 5. The ventilated range is shown, in detail, together with the plug-in components in U.S. Pat. No. 3,797,375. A box-like, drop-in structure 10 (FIG. 7) carries on its upper surface a grill 11 which overlies a broil element 12 (FIG. 5) and a surface cooking unit cartridge 13 (shown in detail in FIG. 4). Underlying the structure 10 is a ventilating fan 14, driven by an electric motor 16 (FIG. 7). The intake of the fan communicates with a filtered plenum 17 which, in turn communicates with a ventilating intake 18 which extends along one side margin of the plug-in cooking units.

Figure 6:
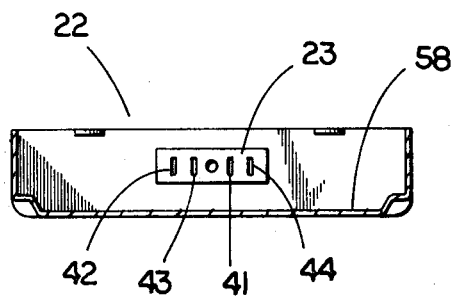
FIG. 6 is a fragmentary, sectional view taken generally along the line 6—6 of FIG. 5.

As will be evident from FIGS. 5 and 6, the upper surface of the range is recessed at 21 and 22 and the front side-wall of each of the recesses is provided with a receptacle 23, the receptacle being adapted to receive the pronged portion of either of the plug-in units 12 or 13. Four manual switches 26, 27, 28 and 29 control the individual units of the plug-in components, four switches being necessary because two dual element surface cartridges may be simultaneously in use and one switch is utilized for controlling separately each of the paired surface heating elements. The structure generally described so far is essentially the same as that disclosed in U.S. Pat. No. 3,797,375.

The concept of the present invention envisages the use of a wiring change in the receptacle and in the pronged portions of the plug-in units to provide for automatic operation of the ventilating fan 14 whenever the broil element 12 is plugged into the receptacle 23 in either of recesses 21 or 22, and to permit selective operation of the ventilating unit when surface cooking cartridges 13 are plugged into the receptacles.

This arrangement is shown schematically in FIG. 1 in which, it will be understood, the fan and line wiring have been simplified for clarity in explaining the function of the circuit arrangement. The power source line wires 31 and 32 are connected across terminals L1 and L2 of the manual switch 26 and across the terminals L1 and L2 of the identical manual switch 27 (it will be understood that the same circuit connections are made for the identical switches 28 and 29 of FIG. 5). The switches themselves form no part of the present invention and are well known in the art as "infinite adjustment" switches in which a bimetal warp element cycles the switch contacts at a cycling rate dependent on the manual adjustment. Such switches are available on the market under the designation "Robertshaw Control Model 240".

The P terminals on both switches are connected together and to a pilot lamp 36. Auxiliary switch contacts, closed with the initial movement of any of the switch knobs, connect the lamp 36 across the line wires L1, and L2. The terminals H1 on switches 26 and 27 are connected together and to terminal 41 in the receptacle 23, continuity between the H1 and P terminals of each switch being established with the initial movement of its manual knob. Terminal H2 of switch 26 is connected to terminal 42 of the receptacle and terminal H2 of switch 27 is connected to terminal 43 of the receptacle. As previously mentioned, this causes electrical power to be available across receptacle terminals 41–42, and 41–43 in a magnitude determined by the position of the adjustment knobs of the respective switches.

The ventilating fan motor 16 is connected to supply line 32 and to terminal 44 of receptacle 23. As may be seen in FIG. 2, the rear cooking element 13a is connected to prongs or terminals 51 and 52 of the surface cooking cartridge 13 and the front cooking element 13b is connected to terminal 53 and to terminal 52. The terminals 51, 52 and 53, front and rear elements 13a and 13b, and the blank grounding prong 50 are all shown, additionally in FIG. 4.

The broil component 12 is shown in FIGS. 3 and 5 and is of the conventional sheathed-resistance type. The ends of the element are connected to terminals 61 and 62 (FIG. 3) and an additional terminal or prong 63 is connected, internally, to the terminal 62. These terminals are also visible in FIG. 5, as is the grounding terminal 60.

The presence of terminal 63 in the broil or grill unit 12 and connection of fan motor 16 to terminal 44 of the receptacle 23 assures that the fan motor will be controlled by manual switch 27 (through the closure of the circuit between its terminals H1 and L1) only when the broil element 12 is plugged into the receptacle 23. As will be evident from FIGS. 1 and 3, when this occurs, terminals 61, 62 and 63 of the element 12 will be electrically connected to terminals 43, 41 and 44, respectively, of the receptacle. Fan motor 12 will be energized as soon as the manual knob for switch 27 is moved, closing the H1-L1 circuit in the switch, and the level of energization of the broil element will be controlled by the adjusted state of the H2-L2 circuit in the switch.

When the surface cooking cartridge 13 is inserted in the receptacle, terminals 53, 51 and 52 will connect with terminals 42, 43 and 41, respectively. When so connected, the front element 13b will be controlled, as to its level of energization, by the H2-L2 circuit through switch 26 and rear element 13a will be controlled by the H2-L2 circuit through switch 27, control of elements 13a and 13b being independent. With the surface cooking cartridge 13 in place the ventilating fan motor 16 cannot be energized through either switch 26 or 27. If the ventilating fan is to be selectively operated with one or both of the elements 13a and 13b, a separate circuit (not shown), isolated from receptacle 13, connecting the fan motor 16 to the supply lines 31 and 32 may be provided, this circuit being controlled by a conveniently mounted on-off switch.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A range of the type having a recessed upper surface receiving a plug-in electrical broiling element and a plug-in surface cooking cartridge having a plurality of electrical heating units, an electric motor driven fan disposed below the recessed upper surface for drawing air across said surface to ventilate the upper surface area, manualy operable control switches for setting the power input to said broiling element and to each of the heating units in said cartridge, a single one of said switches controlling either said broiling element if it is in place in said recessed surface and one of said heating units if the cartridge is in place in said recessed surface, a receptacle disposed in said recessed upper surface, said cartridge and said broiling element each having a pronged plug adapted to be received in the receptacle, circuit means connecting said receptacle across an electrical power source through said control switches and connecting the fan driving motor to one side of said power source and to said receptacle, said range being characterized by the pronged plug associated with said broiling element having power input prongs connecting said element across the power source when inserted in the receptacle and an additional prong electrically connected to that one of said power input prongs having electrical continuity to the other side of said power source, said additional prong connecting, through said receptacle, to the fan motor, said pronged plug of the cartridge element being characterized by an absence of a counterpart of said additional prong, whereby said fan motor is energized whenever said broil element is energized through said one single control switch but is not energized through said receptacle when said one of the heating units of the cartridge is energized through said one single control switch.

2. A range as claimed in claim 1 in which the plurality of heating units in the surface cooking cartridge is composed of a front and rear heating unit with said one of the heating units controlled by said single one of said control switches being the rear heating unit.

* * * * *